J. H. SIMS.
PUMP.
APPLICATION FILED MAY 18, 1911. RENEWED MAR. 22, 1912.
1,025,211.
Patented May 7, 1912.
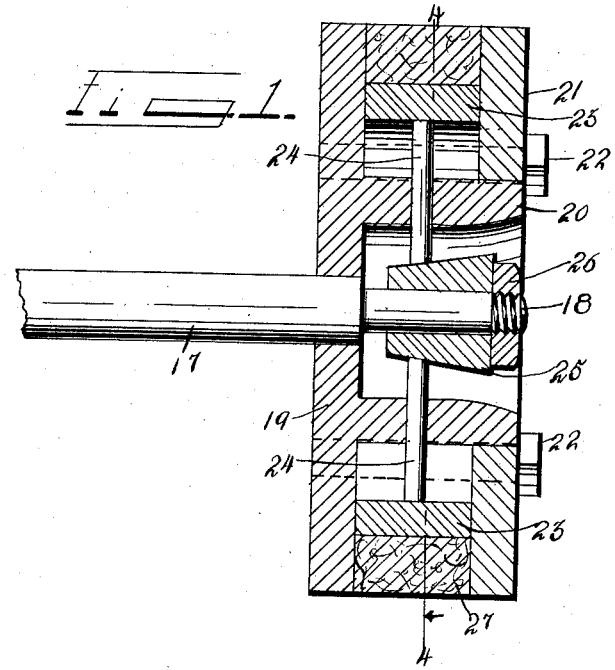
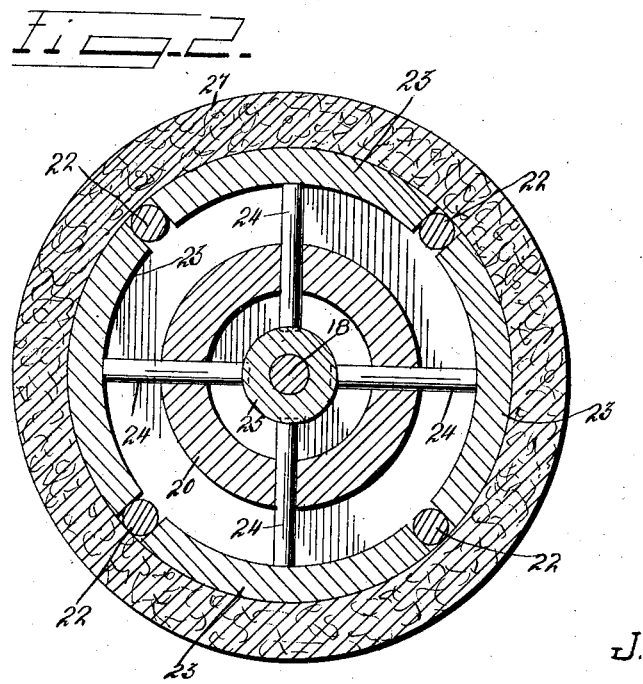
Witnesses
Francis Boyle
Inventor
J. H. Sims
By Chandler & Chandler
Attorneys

UNITED STATES PATENT OFFICE.

JOHN H. SIMS, OF CIMARRON, NEW MEXICO, ASSIGNOR OF ONE-HALF TO J. M. MENAPACE, OF CIMARRON, NEW MEXICO.

PUMP.

1,025,211. Specification of Letters Patent. Patented May 7, 1912.

Application filed May 18, 1911, Serial No. 627,967. Renewed March 22, 1912. Serial No. 685,414.

*To all whom it may concern:*

Be it known that I, JOHN H. SIMS, a citizen of the United States, residing at Cimarron, in the county of Colfax, State of New Mexico, have invented certain new and useful Improvements in Pumps; and I do hereby declare the following to be a full, clear, and exact description of the invention, such as will enable others skilled in the art to which it appertains to make and use the same.

This invention relates to pumps, and has for an object to provide a novel piston which will be more durable than similar devices of this character, due to the novel construction of its packing adjusting means.

In pistons as now constructed in which a conical washer on the piston rod serves to push out tensioning blocks against the packing element to maintain the latter tight against the inner wall of the cylinder, there will be a tendency for one side of the packing to wear more than the other, due to non-uniformity in the packing element construction, and therefore this worn portion will be weaker than the remaining portions and a pull will be exerted upon this portion by the next adjacent tensioning blocks, often times resulting in the tensioning block which carries the weakened portion of the packing element being dislodged or warped out of its working portion. To prevent an occurrence of this kind, I dispose the bolts which connect the plates of the piston heads together between confronting ends of adjacent tensioning blocks so that in case of a block being forced to one side or the other to an abnormal degree, it will bear against one of the adjacent bolts and be prevented from distortion or warping out of its working position.

With the above objects in view the invention consists in certain novel details of construction and combination of parts hereinafter fully described and claimed, it being understood that various modifications may be made in the minor details of construction within the scope of the appended claim.

In the accompanying drawings forming part of this specification, Figure 1 is an enlarged longitudinal sectional view through the piston. Fig. 2 is an enlarged cross sectional view taken on the line 4—4 Fig. 1.

The piston comprises a rod 17 which is provided with a reduced threaded end 18. A circular head 19 is fixed to the piston, and is provided with an annulus 20 which supports a second circular head 21, both heads being bolted together by stud bolts or the like 22.

Arranged between the circular series of bolts is a plurality of arcuate tension blocks 23, the outer ends of each block confronting two adjacent bolts as clearly shown in Fig. 4, and the tension block being limited in its lateral movement by contact with these bolts although not normally intimately contacting with either. Each tension block is provided with a radial stem 24 which projects loosely through a suitable opening in the annulus and bears upon a frusto-conical slide sleeve 25 which is loosely fitted on the reduced extremity 18 of the piston rod. A nut 26 is threaded onto the end of the reduced extremity and bears against the slide sleeve, adjustment of this nut serving to move the sleeve inwardly and cause all the tension blocks to be simultaneously moved outward. A rubber fabric or similar packing element 27 of annular form is mounted on the tension blocks between the heads 19 and 21, radial outward movement of the tension block serving to expand the packing element in all directions outwardly and into intimate contact with the inner wall of the cylinder so that leakage through the piston will be positively obviated.

By virtue of the arcuate tension blocks being arranged between adjacent bolts and having their ends confronting the bolts, it will be noted that should any particular block be forced laterally to an abnormal degree by unequal wearing of the packing element, that it will bear against one of the adjacent bolts and be prevented from distortion or warping out of its working position.

What is claimed, is:—

A piston including a rod having a threaded reduced end, spaced heads on said piston, bolts connecting said heads, an annulus on one of said heads, arcuate tension blocks between said bolts having their opposite ends confronting said bolts and limited in lateral movement thereby, said blocks having radial stems fitting loosely in and projecting into the interior of said annulus, an annular packing element between said heads and having its inner periphery in intimate contact with said tension blocks, a frusto-conical slide on the reduced end of said rod bearing upon the inner ends of said stems and operating to cam said tension blocks against said packing element, and an adjusting nut on the threaded portion of said reduced end bearing against said sleeve.

In testimony whereof, I affix my signature, in presence of two witnesses.

JOHN H. SIMS.

Witnesses:
L. R. BUTLER,
C. J. LODGE.

Copies of this patent may be obtained for five cents each, by addressing the "Commissioner of Patents, Washington, D. C."